(12) United States Patent
Yamaki et al.

(10) Patent No.: US 11,685,846 B2
(45) Date of Patent: Jun. 27, 2023

(54) TRANSPARENT CONDUCTING FILM

(71) Applicant: SHOWA DENKO K. K., Tokyo (JP)

(72) Inventors: Shigeru Yamaki, Tokyo (JP); Shuhei Yoneda, Tokyo (JP)

(73) Assignee: SHOWA DENKO K. K., Tokyo (JP)

( * ) Notice: Subject to any disclaimer, the term of this patent is extended or adjusted under 35 U.S.C. 154(b) by 38 days.

(21) Appl. No.: 17/595,961

(22) PCT Filed: May 18, 2021

(86) PCT No.: PCT/JP2021/018744
§ 371 (c)(1),
(2) Date: Nov. 30, 2021

(87) PCT Pub. No.: WO2022/044448
PCT Pub. Date: Mar. 3, 2022

(65) Prior Publication Data
US 2023/0119637 A1    Apr. 20, 2023

(30) Foreign Application Priority Data
Aug. 26, 2020 (JP) .............................. JP2020-142591

(51) Int. Cl.
*C09J 133/08* (2006.01)
*H01B 5/14* (2006.01)
(Continued)

(52) U.S. Cl.
CPC .............. *C09J 133/08* (2013.01); *C08K 3/08* (2013.01); *C08K 7/06* (2013.01); *H01B 1/22* (2013.01);
(Continued)

(58) Field of Classification Search
CPC .... C08K 3/08; C08K 7/06; C08K 2003/0806; C08K 2201/011; C09J 133/08; H01B 1/22; H01B 5/14
(Continued)

(56) References Cited

U.S. PATENT DOCUMENTS

2014/0048131 A1    2/2014  Tanaka et al.
2017/0139514 A1    5/2017  Kim et al.
(Continued)

FOREIGN PATENT DOCUMENTS

CN    105745720 A    7/2016
CN    206322484 U    7/2017
(Continued)

OTHER PUBLICATIONS

International Search Report for PCT/JP2021/018744 dated Jul. 27, 2021 [PCT/ISA/210].
(Continued)

*Primary Examiner* — Tri V Nguyen
(74) *Attorney, Agent, or Firm* — Sughrue Mion, PLLC

(57) ABSTRACT

Provided is a transparent conducting film having a preferable optical property, a preferable electrical property, and further, a superior durability of folding. The transparent conducting film comprises a transparent substrate and a transparent conducting layer formed on at least one of main faces of the transparent substrate, wherein the transparent conducting layer contains a binder resin and a conducting fiber, a cut portion of the transparent conducting film has a straightness of 0.050 mm or less. Preferably, the transparent substrate is a resin film having an elongated resin film or cut out from an elongated film, and can be folded in with a folding axis in the direction perpendicular to the longitudinal direction of the elongated resin film.

20 Claims, 4 Drawing Sheets

(51) Int. Cl.
  *H01B 1/22* (2006.01)
  *C08K 3/08* (2006.01)
  *C08K 7/06* (2006.01)

(52) U.S. Cl.
  CPC ....... *H01B 5/14* (2013.01); *C08K 2003/0806* (2013.01); *C08K 2201/011* (2013.01)

(58) Field of Classification Search
  USPC ........................................................ 428/337
  See application file for complete search history.

(56) References Cited

U.S. PATENT DOCUMENTS

| | | | |
|---|---|---|---|
| 2019/0139673 A1 | 5/2019 | Harai et al. | |
| 2019/0388933 A1 | 12/2019 | Toba et al. | |
| 2020/0150789 A1* | 5/2020 | Woody, V | ............ B65G 1/0435 |

FOREIGN PATENT DOCUMENTS

| | | | | |
|---|---|---|---|---|
| CN | 108292183 A | | 7/2018 | |
| CN | 109476142 A | * | 3/2019 | ............ B32B 27/08 |
| CN | 109923622 A | | 6/2019 | |
| CN | 110088848 A | | 8/2019 | |
| JP | 2011-035213 A | | 2/2011 | |
| JP | 2013-225460 A | | 10/2013 | |
| JP | 2017-92036 A | | 5/2017 | |
| JP | 2020-102362 A | | 7/2020 | |
| WO | 2009/035059 A1 | | 3/2009 | |
| WO | 2018/003713 A1 | | 1/2018 | |
| WO | 2018/101334 A1 | | 6/2018 | |
| WO | 2019/151293 A1 | | 8/2019 | |

OTHER PUBLICATIONS

International Report on Patentability for PCT/JP2021/018744 dated Jul. 14, 2021 [PCT/ISA/237].

* cited by examiner

[FIG. 1]
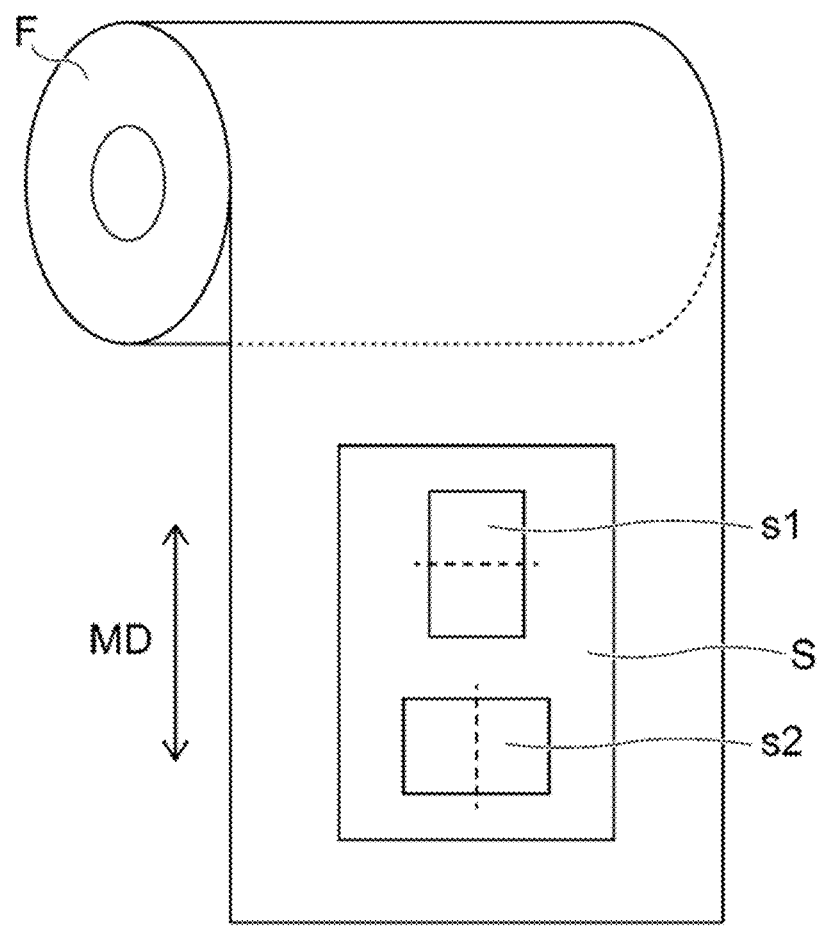

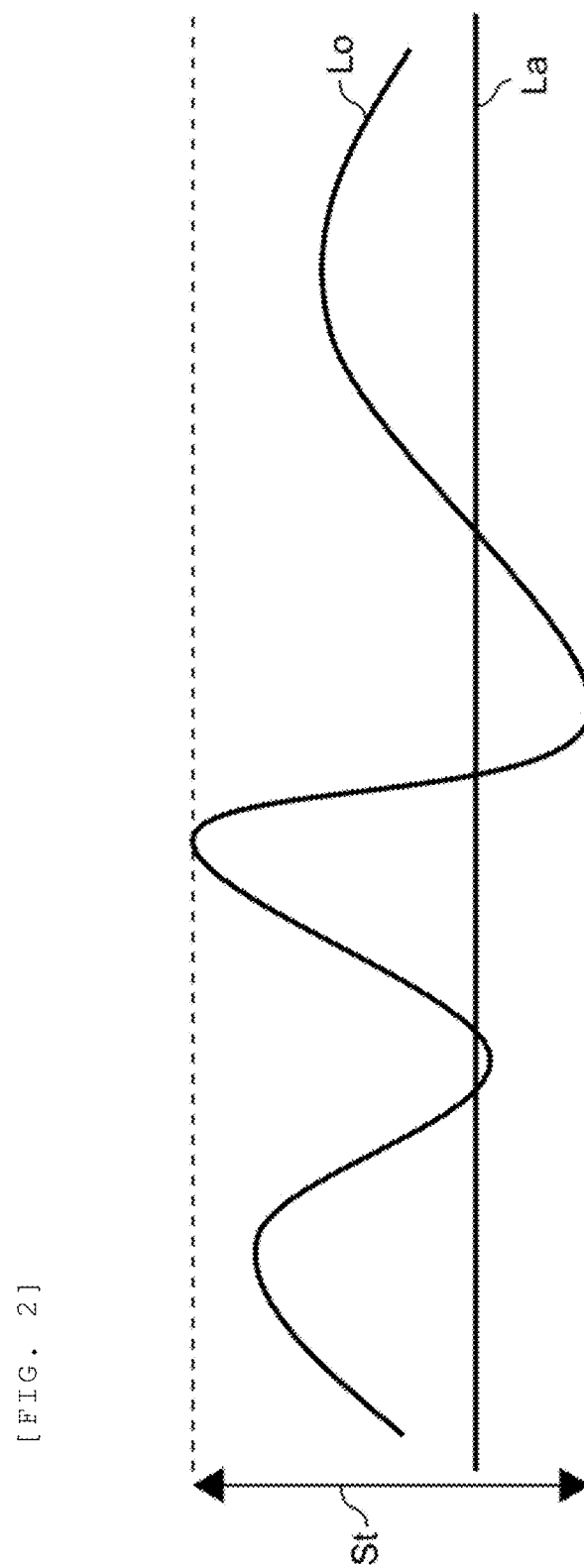

[FIG. 3]
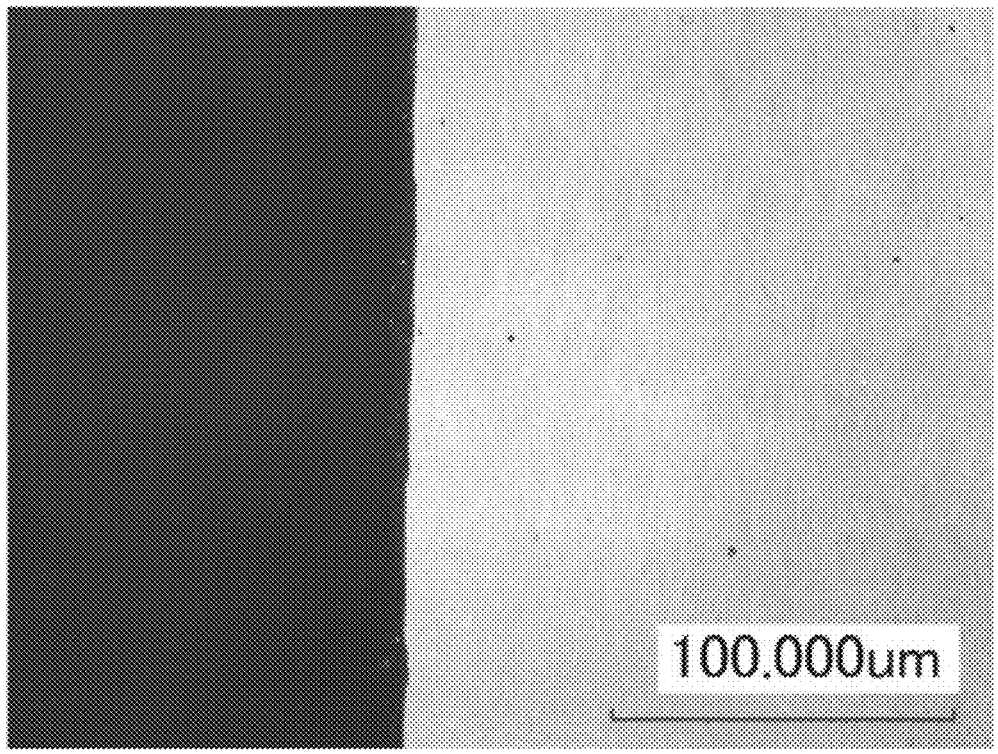
[FIG. 4]
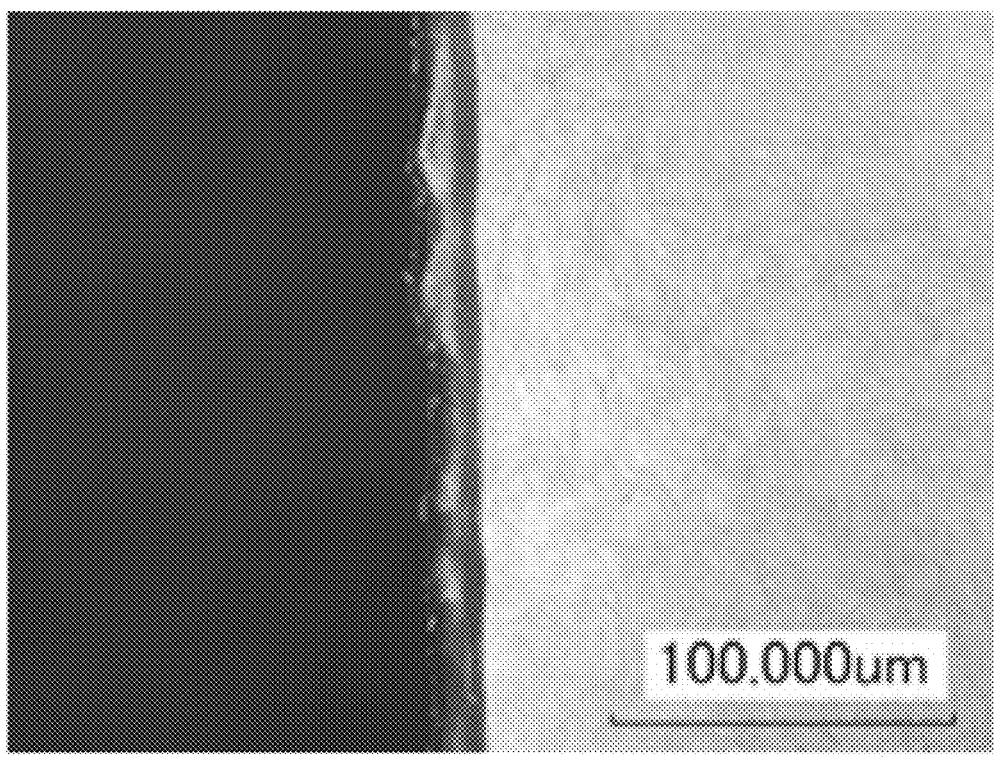

[FIG. 5]
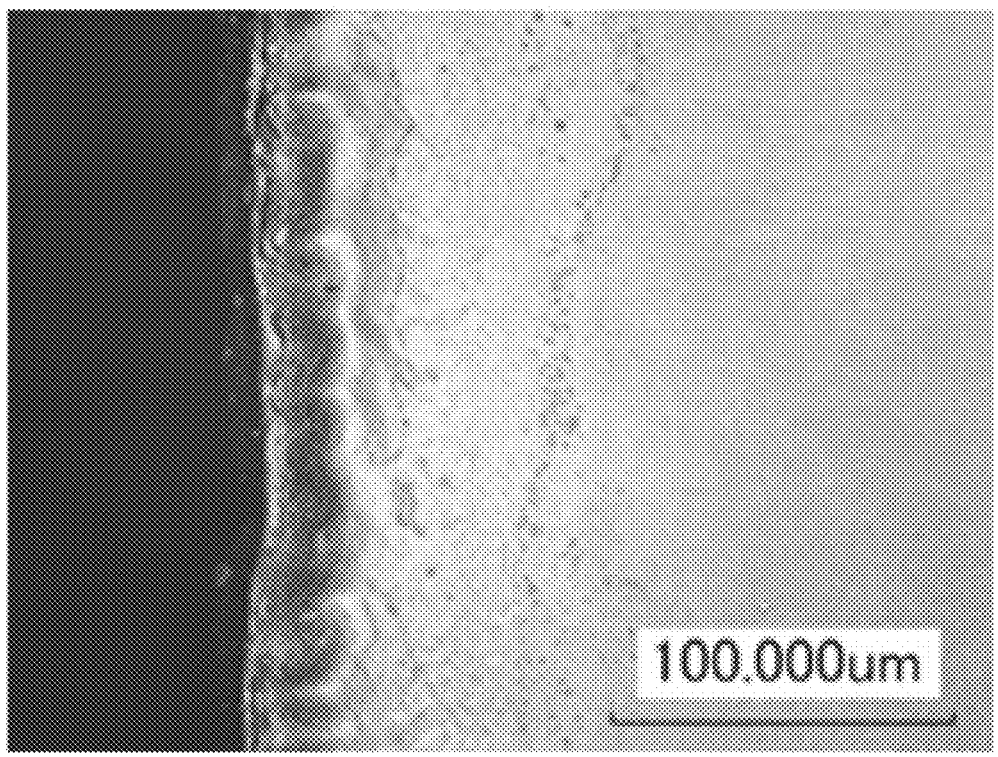
[FIG. 6]
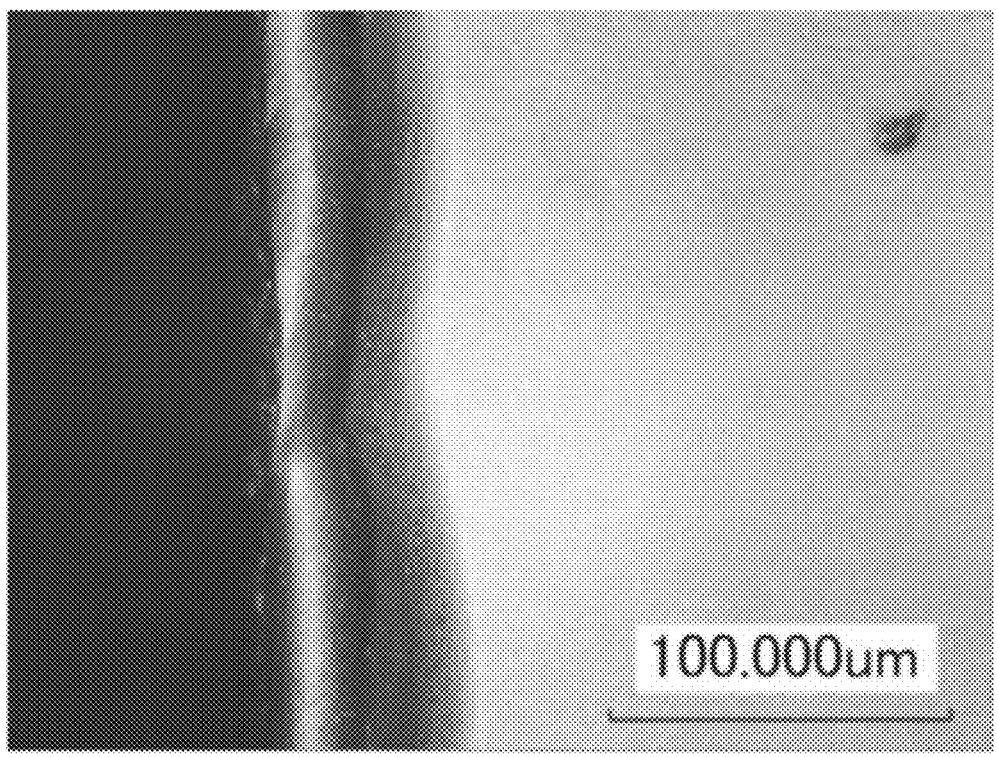

TRANSPARENT CONDUCTING FILM

TECHNICAL FIELD

The present disclosure relates to a transparent conducting film.

BACKGROUND ART

A transparent conducting film is used in various fields, such as a liquid crystal display (LCD), a plasma display panel (PDP), an organic electroluminescence display, a transparent electrode for a photovoltaic cell (PV) and a touch panel (TP), an electrostatic discharge (ESD) film, an electromagnetic interference (EMI) film, and the like. For such transparent conducting films, conventionally, films using ITO (indium tin oxide) have been used.

Recently, touch panels are adopted for smartphones, car navigation systems, vending machines, etc. In particular, since a foldable smartphone attracts attention, there is a desire for a foldable touch panel.

In order to obtain a foldable touch panel, a foldable transparent film and transparent conducting layer, namely, a transparent conducting film having a superior durability of folding is necessary. In view of the application to a foldable smartphone, it is preferable that the curvature radius of the transparent conducting film at the time of folding is as small as possible, the change in appearance (fracture, etc.) does not occur even if the folding is repeated, and the change in performance (resistance) when the folding is repeated is also as small as possible.

In particular, upon production of a foldable smartphone, the smartphone should have durability of folding for 200,000 times or more at a curvature radius of 2.0 mm or less. Further, the transparent conducting film preferably has a sheet resistance of 100Ω/□ or less.

Further, when a transparent conducting film is applied in a device such as a smartphone, a conducting layer and a protection film are formed on a transparent resin film substrate, and then, there is a step of adjusting (cutting) the size of the resulting transparent conducting film to be fit with the size of the device.

However, a transparent conducting layer conventionally used in a transparent conducting film for a touch panel is mainly made of a metal oxide such as ITO, and thus, there are problem that when the film is fold, the transparent conducting layer is broken, resulting in remarkably deteriorating the conductivity. In order to solve the problem, a metal nanowire has been developed for a transparent conducting layer of the next generation.

Patent Document 1 discloses a silver nanowire film which can maintain its conductivity after the mandrel test in which the film is folded into a cylindrical shape. However, the disclosed curvature radius is 5 mm, being large and evaluation is performed after only 20 repeats. Further, a cutting method of the film is not disclosed.

Patent Document 2 discloses a silver nanowire cyclo-olefin polymer (COP) film having a superior foldability, but the disclosed curvature radius is 5 mm, being large and evaluation is performed after only approximately 10,000 repeats.

Patent Document 3 also discloses silver nanowire COP film having a superior foldability, but the disclosed curvature radius is 2.5 mm, being large and in addition, a surface resistance value of the conducting film shown in the Example is 150 Ω/sq. or more, which is too high for producing a touch panel.

The applicant previously discloses, by Patent Document 4, a transparent conducting film comprising a transparent substrate, a transparent conducting layer having a binder resin and conducting fibers (metal nanowires) and formed on at least one of the main faces of the transparent substrate, and a protective layer formed on the transparent conducting layer. However, Patent Document 4 is silent regarding problems relating to the durability of folding, and fails to describe or suggest configurations suitable for obtaining the durability of folding.

PRIOR ARTS

Patent Document

Patent Document 1: Japanese Unexamined Patent Publication (Kokai) No. 2013-225460
Patent Document 2: WO 2019/151293 pamphlet
Patent Document 3: WO 2018/003713 pamphlet
Patent Document 4: WO 2018/101334 pamphlet

SUMMARY

One of the objectives of the present disclosure is to provide a transparent conducting film having a preferable optical property, a preferable electrical property, and further having a superior durability of folding.

The present disclosure has the following aspects.

[1] A transparent conducting film comprising a transparent substrate, and a transparent conducting layer formed on at least one of main faces of the transparent substrate, wherein a cut portion of the transparent conducting film has a straightness of 0.050 mm or less.

[2] A transparent conducting film according to [1], wherein the transparent conducting layer contains at least a binder resin and a conducting fiber, and a protective layer is provided on the transparent conducting layer.

[3] A transparent conducting film according to [2], wherein the conducting fiber is a metal nanowire.

[4] A transparent conducting film according to [3], wherein the metal nanowire is a silver nanowire.

[5] A transparent conducting film according to any one of [2] to [4], wherein the binder resin is soluble in alcohol, water, or a mixed solvent of alcohol and water.

[6] A transparent conducting film according to any one of [2] to [5], wherein the binder resin contains one selected from a group consisting of poly-N-vinylpyrrolidone, hydrophilic cellulose-based resin, butyral resin, and poly-N-vinylacetamide.

[7] A transparent conducting film according to any one of [1] to [6], wherein the transparent substrate is a cyclo-olefin polymer (COP) film.

[8] A transparent conducting film according to [7], wherein the cyclo-olefin polymer (COP) film has a thickness of 5 to 25 μm.

[9] A transparent conducting film according to [7] or [8], wherein the cyclo-olefin polymer (COP) film has a glass transition temperature (Tg) of 100 to 170° C.

A transparent conducting film according to any one of [2] to [6], wherein the protective layer is a cured layer of a curable resin composite, and a content of an aromatic ring-containing compound in the solid content of the curable resin composite is 15% by mass or less.

A transparent conducting film according to [1], wherein the transparent substrate is an elongated resin film or a resin film cut out from an elongated resin film, and is foldable with a direction perpendicular to the longitudinal direction of the elongated resin film as a folding axis.

A transparent conducting film according to any one of [1] to [11], wherein, when a resistance value ($R_0$) and a resistance value (R) respectively represent resistance values of the transparent conducting film before and after a folding test of 200,000 times of folding using a clamshell type durability tester in which a curvature radius is set to 0.5 mm, the ratio ($R/R_0$) is 2.0 or less.

According to the present disclosure, a transparent conducting film having a preferable optical property, a preferable electric property, and further having a superior durability of folding can be provided.

BRIEF DESCRIPTION OF DRAWINGS

FIG. 1 is an explanatory view explaining a method for cutting out a sample from a resin film.

FIG. 2 is a schematic view of straightness.

FIG. 3 shows a laser microscope observation image of a cut portion (straightness: 0.028 mm) formed by Thomson processing.

FIG. 4 shows a laser microscope observation image of a cut portion (straightness: 0.050 mm) formed by a disc cutter.

FIG. 5 shows a laser microscope observation image of a cut portion (straightness: 0.060 mm) formed by laser cutting.

FIG. 6 shows a laser microscope observation image of a cut portion (straightness: 0.176 mm) formed by a cutter knife.

ASPECT OF DISCLOSURE

Hereinbelow, aspects of the present disclosure (hereinbelow, referred to as aspects) will be explained.

A transparent conducting film according to the present aspect comprises a transparent substrate, and a transparent conducting layer formed on at least one of the main faces of the transparent substrate, and has features that a cut portion of the transparent substrate has a straightness of 0.050 mm or less. In the present specification, "transparent" refers to a total light transmittance of 75% or more.

The transparent conducting layer comprises at least a binder resin and a conducting fiber, and a protective layer may be formed on the transparent conducting layer to protect the transparent conducting layer.

<Transparent Substrate>

As far as nonconductive, the transparent substrate is not particularly limited. The transparent substrate is preferably uncolored, but may be colored. The transparent substrate preferably has a high total light transmittance (transparency to visible light), the total light transmittance being preferably 80% or higher. For example, a resin film such as polyester (polyethylene terephthalate [PET], polyethylene naphthalate [PEN], etc.), polycarbonate, acrylic resin (polymethyl methacrylate [PMMA], etc.), cyclo-olefin polymer, and the like, may be preferably used. Further, as far as the optical property, electrical property, and durability of folding are not damaged, a layer or a plurality of layers having a function of easy adhesion, optical adjustment (antiglare, antireflection, etc.), hard coating, etc., may be provided on one face or both faces of the transparent substrate. Among these resin films, in view of the superior light transmittance (transparency), flexibility, mechanical property, etc., using polyethylene terephthalate, cyclo-olefin polymer is preferable. Examples of the cyclo-olefin polymer include: hydrogenated ring-opening metathesis polymerization type cyclo-olefin polymer of norbornene (ZEONOR (registered trademark, manufactured by Zeon Corporation), ZEONEX (registered trademark, manufactured by Zeon Corporation), ARTON (registered trademark, manufactured by JSR Corporation), etc.), norbornene/ethylene addition copolymer type cyclo-olefin polymer (APEL (registered trademark, manufactured by Mitsui Chemicals Inc.), TOPAS (registered trademark, manufactured by Polyplastics Co., Ltd.)). Specific examples are COSMOSHINE A4100, COSMOSHINE A4160, ZEONOR ZF-14, ZEONOR ZF-16, ARTON RX4500, ARTON RH4900, and ARTON R5000. Regarding the above, in order to be resistant against heating in the subsequent steps of forming lead wiring, connecting part etc., a glass transition temperature (Tg) is preferably 100 to 170° C., more preferably 125 to 145° C., and a thickness is preferably 1 to 50 μm, more preferably 5 to 25 μm, still more preferably 8 to 23 μm, and particularly preferably 10 to 20 μm.

<Transparent Conductive Layer>

The conducting fiber structuring the transparent conducting layer may be metal nanowire, carbon fiber, etc., and using the metal nanowire is preferable. The metal nanowire is a conductive material made of metal and having a wire shape with a diameter in the order of nanometer. In the present aspect, in addition to (by mixing with) or instead of the metal nanowire, metal nanotube which is a conductive material having a porous or nonporous tubular shape, may be used. In the present specification, both the "wire shape" and the "tubular shape" refer to a linear shape, but the former refers to a solid body, while the latter refers to a hollow body. Both may be soft or rigid. The former is referred to as a "metal nanowire in a narrow sense", and the latter is referred to a "metal nanotube in a narrow sense". Hereinbelow, in the present specification, the term "metal nanowire" is used to include both the metal nanowire in a narrow sense and the metal nanotube in a narrow sense. Only the metal nanowire in a narrow sense, or only the metal nanotube in a narrow sense may be used, or they may be mixed for use.

As a method for producing the metal nanowire, a known method may be applied. For example, silver nanowires may be synthesized by reducing the silver nitrate under the presence of polyvinylpyrrolidone, using a poly-ol method (refer to Chem. Mater., 2002, 14, 4736). Similarly, gold nanowires may be synthesized by reducing the gold chloride acid hydrate under the presence of polyvinylpyrrolidone (refer to J. Am. Chem. Soc., 2007, 129, 1733). WO 2008/073143 pamphlet and WO 2008/046058 pamphlet have detailed description regarding the technology of large scale synthesis and purification of silver nanowires and gold nanowires. Gold nanotubes having a porous structure may be synthesized by using silver nanowires as templates, and reducing a gold chloride acid solution. The silver nanowires used as templates are dissolved in the solution by oxidation-reduction reaction with the gold chloride acid, and as a result, gold nanotubes having a porous structure can be produced (refer to J. Am. Chem. Soc., 2004, 126, 3892-3901).

The metal nanowires have an average diameter size of preferably 1 to 500 nm, more preferably 5 to 200 nm, still more preferably 5 to 100 nm, and particularly preferably 10 to 50 nm. The metal nanowires have an average major axis length of preferably 1 to 100 μm, more preferably 1 to 80 μm, still more preferably 2 to 70 μm, and particularly preferably 5 to 50 μm. While satisfying the above average diameter size and the average major axis length, the metal nanowires have an average aspect ratio of preferably more than 5, more preferably 10 or more, still more preferably 100 or more, and particularly preferably 200 or more. Here, the aspect ratio refers to a value obtained by a/b, wherein "b" represents an average diameter size of the metal nanowire and "a" represents an average major axis length thereof. The values "a" and "b" may be measured by a scanning electron microscope (SEM) and an optical microscope. Specifically, diameters of arbitrarily selected 100 silver nanowires are respectively measured by using Field Emission Scanning Electron Microscope JSM-7000F (manufactured by JEOL Ltd.), and an arithmetic average value was calculated as b (average diameter). Also, lengths of arbitrarily selected 100 silver nanowires are respectively measured by using Shape Measurement Laser Microscope VK-X200 (manufactured by Keyence Corporation), and an arithmetic average value was calculated as the average value a (average length).

Materials for the metal nanowires may be at least one selected from the group consisting of gold, silver, platinum, copper, nickel, iron, cobalt, zinc, ruthenium, rhodium, palladium, cadmium, osmium, and iridium, or may be an alloy etc., formed by combining some of these. In order to obtain a coating film having a low sheet resistance and a high total light transmittance, containing at least one of gold, silver, and copper is preferable. These metals have a high conductivity, and thus, when a certain sheet resistance should be obtained, the density of the metal within the surface may be reduced, and a high total light transmittance can be achieved. Among these metals, containing at least gold or silver is preferable. The most appropriate example may be the silver nanowire.

In the present specification, the transparent conducting layer refers to a thin layer which includes a conducting fiber and a binder resin, and has a thickness of 10 to 300 nm. The thickness does not have to be uniform. As for the binder resin, anything can be used as far as the objectives of the present disclosure can be satisfied, i.e., the durability of folding and the transparency are sufficient. However, when metal nanowires produced by the polyol method are used for the conducting fiber, in view of the compatibility with the solvent for producing the metal nanowires (polyol), a binder resin soluble in alcohol, water, or a mixed solvent of alcohol and water is preferably used. Specific examples include: poly-N-vinylpyrrolidone, a hydrophilic cellulose-based resin such as methyl cellulose, hydroxyethyl cellulose, and carboxymethyl cellulose, a butyral resin, and poly-N-vinylacetamide (PNVA (registered trademark)). Poly-N-vinylacetamide is a homopolymer of N-vinylacetamide (NVA), but a copolymer having 70 mol % or more of N-vinylacetamide (NVA) may also be used. Examples of a monomer which can be copolymerized with NVA include: N-vinylformamide, N-vinylpyrrolidone, acrylic acid, methacrylic acid, sodium acrylate, sodium methacrylate, acrylamide, acrylonitrile, and the like. The more the content of the copolymerized component, the higher the sheet resistance of the transparent conducting layer to be obtained, the lower the adhesion between the silver nanowires and the substrate, and the lower the heat resistance (thermal decomposition starting temperature). Therefore, the polymer contains the monomer unit derived from N-vinylacetamide preferably 70 mol % or more, more preferably 80 mol % or more, and still more preferably 90 mol % or more. Such a polymer has a weight-average molecular weight in terms of an absolute molecular weight, of preferably 30,000 to 4,000,000, more preferably 100,000 to 3,000,000, and still more preferably 300,000 to 1,500,000. The absolute molecular weights were measured by the following method.

<Measurement of Absolute Molecular Weight>

A binder resin was dissolved in the following eluent, and was left to stand for 20 hours. In the solution, the concentration of the binder resin is 0.05% by mass.

The solution was filtered by a 0.45 μm membrane filter, and a weight-average molecular weight based on the absolute molecular weight of the filtrate was measured by GPC-MALS.

GPC: Shodex (Registered Trademark) SYSTEM21, manufactured by Showa Denko K.K.

Column: TSKgel (Registered Trademark) G6000PW manufactured by Tosoh Corporation

Column Temperature: 40° C.

Eluent: 0.1 mol/L $NaH_2PO_4$ aqueous solution+0.1 mol/L $Na_2HPO_4$ aqueous solution Flow Rate: 0.64 mL/min Sample Injection Amount: 100 μL MALS Detector: Wyatt Technology Corporation, DAWN (registered trademark) DSP Laser Wavelength: 633 nm Multiangle Fitting Method: Berry Method One of the above resins may be used solely, but two or more types of the resins may be used in combination. When two or more types of resins are used in combination, the combination may be a simple mixing, or may be a copolymer.

The transparent conducting layer can be formed by printing a conductive ink containing the conducting fiber, the binder resin, and a solvent, on at least one of the main faces of the transparent substrate, and removing the solvent by drying.

The solvent is not limited as far as the conducting fibers can be preferably dispersed therein, and the binder resin can be dissolved therein. However, when metal nanowires synthesized by the polyol method are used as conducting fibers, taking into account the compatibility with the solvent of production (polyol), alcohol, water, or a mixed solvent of alcohol and water are preferable. As mentioned above, a preferable binder resin is also the one soluble in alcohol, water, or a mixed solvent of alcohol and water. From the viewpoint of easily controlling the drying speed of the binder resin, using a mixed solvent of alcohol and water is more preferable. The alcohol includes at least one type of saturated monohydric alcohols having 1 to 3 carbon atoms (methanol, ethanol, n-propanol, isopropanol), which are represented by $C_nH_{2n+1}OH$ (n being an integer of 1 to 3) [hereinbelow, merely described as "saturated monohydric alcohol having 1 to 3 carbon atoms"]. The saturated monohydric alcohol having 1 to 3 carbon atoms is contained preferably 40% by mass or more in the alcohol in total. Using the saturated monohydric alcohol having 1 to 3 carbon atoms is advantageous because drying process becomes easy. Alcohols other than the saturated monohydric alcohol having 1 to 3 carbon atoms can be used together. Examples of other alcohols which can be used together with the saturated monohydric alcohol having 1 to 3 carbon atoms include ethylene glycol, propylene glycol, ethylene glycol monomethylether, ethylene glycol monoethylether, propylene glycol monomethylether, propylene glycol monoethylether, and the like. Using such alcohol together with the saturated monohydric alcohol having 1 to 3 carbon atoms is advantageous because the drying speed can be adjusted. The content of the total alcohol in the mixed solvent is preferably 5% to 90% by mass. If the alcohol content in the mixed solvent is less than 5% by mass or more than 90% by mass, there are drawbacks such that a strip pattern (uneven coating) is generated at the time of coating.

The conductive ink can be produced by stirring and mixing the binder resin, the conducting fibers, and the solvent, using a planetary centrifugal mixer, etc. The content of the binder resin in the conductive ink is preferably in the range of 0.01% to 1.0% by mass. The content of the conducting fiber contained in the conductive ink is preferably in the range of 0.01% to 1.0% by mass. The content of the solvent in the conductive ink is preferably in the range of 98.0% to 99.98% by mass.

The conductive ink may be printed by a bar-coating method, spin-coating method, spray coating method, gravure printing, slit coating, and the like. The shape of a printed film or pattern formed thereby is not particularly limited, but may be a shape of wiring or electrode pattern formed on the substrate, a shape of a film covering the entirety or a part of the substrate (solid paint pattern), or the like. The formed pattern can be made conductive by heating and drying the solvent. The preferable thickness of the transparent conducting layer or the transparent conducting pattern obtained after the solvent is dried may be different depending on the diameter of the conducting fiber used, or a desired sheet resistance value, but the thickness is preferably 10 to 300 nm, and more preferably 30 to 200 nm. If the thickness is 10 nm or more, the number of intersections of the conducting fibers increases, resulting in showing preferable conductivity. If the thickness is 300 nm or less, more light can be transmitted and reflection by the conducting fiber is suppressed, and thus, a preferable optical property can be obtained. The formed conducting pattern can be made conductive by heating and drying the solvent. However, in accordance with needs, an appropriate photoirradiation may be applied to the conducting pattern.

<Protective Layer>

The protective layer which protects the transparent conducting layer is a cured layer of a curable resin composite. The curable resin composite preferably contains (A) a polyurethane containing a carboxy group, (B) an epoxy compound, (C) a curing accelerator, and (D) a solvent. The curable resin composite is formed on the transparent conducting layer by printing, coating, etc., and is cured to form a protective layer. Curing of the curable resin composite can be performed, for example, when a thermosetting resin composite is used, by heating and drying the thermosetting resin composite.

When a photocurable resin composite is used as the curable resin composite, curing is performed by absorbing light, and thus, a light absorbing component remains in a cured film. Therefore, the photocurable resin composite can be preferably used within a range that the total light transmittance and the durability of folding are well-balanced.

The (A) polyurethane containing a carboxy group has a weight average molecular weight of preferably 1,000 to 100,000, more preferably 2,000 to 70,000, and still more preferably 3,000 to 50,000. Here, the molecular weight is a polystyrene equivalent value measured by gel permeation chromatography (hereinbelow, referred to as GPC). If the molecular weight is less than 1,000, the elongation property, the flexibility, and the strength of the coated layer after printing may be decreased. Whereas, if the molecular weight exceeds 100,000, the solubility of polyurethane to the solvent is decreased, and even when polyurethane can dissolve in the solvent, the viscosity becomes too high, which may cause great limitations in use.

In the present specification, the measurement conditions of GPC are as follows, unless specifically described:
Device Name: HPLC unit HSS-2000, manufactured by JASCO Corporation
Column: Shodex Column LF-804
Eluent: tetrahydrofuran
Flow Rate: 1.0 mL/min
Detector: RI-2031, Plus manufactured by JASCO Corporation
Temperature: 40.0° C.
Sample Volume: Sample loop 100 μL
Sample Concentration: Prepared to approximately 0.1% by mass The (A) polyurethane containing a carboxy group has an acid value of preferably 10 to 140 mg-KOH/g, and more preferably 15 to 130 mg-KOH/g. If the acid value is 10 mg-KOH/g or more, both of a curing property and a solvent resistance are preferable. Whereas, if the acid value is 140 mg-KOH/g or less, solubility to the solvent as polyurethane is preferable, and the viscosity can be easily adjusted to a desired viscosity. Further, problems such as warpage, etc. of a substrate film caused by a too hard cured product, hardly occur.

Further, in the present specification, the acid value of a resin is a value measured by the following method.

Approximately 0.2 g of a sample is precisely weighed by a precision balance into a 100 ml Erlenmeyer flask, and 10 ml of a mixed solvent of ethanol/toluene=½ (mass ratio) is provided thereto to dissolve the sample. Further, 1 to 3 drops of a phenolphthalein ethanol solution are added to the container as an indicator, which is sufficiently stirred until the sample becomes uniform. The resultant is subjected to titration with a 0.1 N potassium hydroxide-ethanol solution. When the indicator continues to be in light red for 30 seconds, it is determined that the neutralization ends. The value obtained from the result using the following calculation formula is treated as an acid value of the resin.

Acid Value (mg-KOH/g)=[B×f×5.611]/S
B: Use amount (ml) of 0.1 N potassium hydroxide-ethanol solution
f: Factor of 0.1 N potassium hydroxide-ethanol solution
S: Quantity (g) of sample More specifically, the (A) polyurethane containing a carboxy group is polyurethane synthesized by using (a1) a polyisocyanate compound, (a2) a polyol compound, and (a3) a dihydroxy compound containing a carboxy group, as monomers. From the viewpoint of weather resistance and light resistance, preferably, each of (a1), (a2), and (a3) does not contain a functional group with conjugate properties such as an aromatic compound. Hereinbelow, each monomer will be explained in more detail.

(a1) Polyisocyanate Compound

For (a1) polyisocyanate compound, usually, diisocyanate which has two isocyanato groups per molecule is used. Examples of the polyisocyanate compound include: aliphatic polyisocyanate, alicyclic polyisocyanate, and the like. One of them may be used by itself, or two or more of them may be used in combination. As far as (A) polyurethane containing a carboxy group is not turned into a gel, a small amount of polyisocyanate having three or more isocyanato groups may also be used.

Examples of the aliphatic polyisocyanate include: 1,3-trimethylene diisocyanate, 1,4-tetramethylene diisocyanate, 1,6-hexamethylene diisocyanate, 1,9-nonamethylene diisocyanate, 1,10-decamethylene diisocyanate, 2,2,4-trimethylhexamethylene diisocyanate, 2,4,4-trimethylhexamethylene diisocyanate, lysine diisocyanate, 2,2'-diethyl ether diisocyanate, dimer acid diisocyanate, and the like.

Examples of the alicyclic polyisocyanate include: 1,4-cyclohexane diisocyanate, 1,3-bis(isocyanatomethyl)cyclohexane, 1,4-bis(isocyanatomethyl)cyclohexane, 3-isocyanatomethyl-3,5,5-trimethylcyclohexyl isocyanate (IPDI, isophorone diisocyanate), bis-(4-isocyanatocyclohexyl) methane (Hydrogenated MDI), hydrogenated (1,3- or 1,4-) xylylene diisocyanate, norbornane diisocyanate, and the like.

Here, if an alicyclic compound having 6 to 30 carbon atoms other than the carbon atoms in the isocyanato group (—NCO group) is used as (a1) polyisocyanate compound, a protective layer formed by the polyurethane resin according to the present aspect has high reliability particularly under high temperature and high humidity, and is suitable as a member for an electronic device component. Among the exemplified alicyclic polyisocyanate, 1,4-cyclohexane diisocyanate, isophorone diisocyanate, bis-(4-isocyanatocyclohexyl) methane, 1,3-bis(isocyanatomethyl) cyclohexane, 1,4-bis(isocyanatomethyl) cyclohexane, are preferable.

From the viewpoints of weather resistance and light resistance, as for (a1) polyisocyanate compound, using a compound which does not have an aromatic ring is preferable. When the aromatic polyisocyanate or the aromatic-aliphatic polyisocyanate is used, in accordance with needs, the content thereof is preferably 50 mol % or less, more preferably 30 mol % or less, and still more preferably 10 mol % or less, relative to the total amount (100 mol %) of (a1) polyisocyanate compound.

(a2) Polyol Compound

The number average molecular weight of (a2) polyol compound (with the proviso that (a2) polyol compound does not include (a3) dihydroxy compound having a carboxy group) is usually 250 to 50,000, preferably 400 to 10,000, and more preferably 500 to 5,000. The molecular weight is a polystyrene equivalent value measured by the GPC under the above-mentioned conditions.

Examples of (a2) polyol compound include: polycarbonate polyol, polyether polyol, polyester polyol, polylactone polyol, polysilicone having hydroxy groups at both ends, and a polyol compound having 18 to 72 carbon atoms obtained by adding hydrogen to a C18 (carbon atom number 18) unsaturated fatty acid made from vegetable oil and a polycarboxilic acid derived from a polymer of the C18 (carbon atom number 18) unsaturated fatty acid, and converting the carboxylic acid into hydroxy groups. Among them, in view of the balance of the water resistance, the insulation reliability, and the adhesion to a substrate material, polycarbonate polyol is preferable.

The polycarbonate polyol can be obtained from diol having 3 to 18 carbon atoms as a raw material, through reaction with carbonate ester or phosgene, and can be represented by, for example, the following structural formula (1):

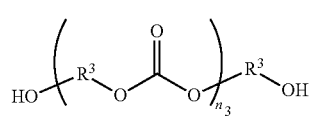

(1)

In Formula (1), $R^3$ represents a residue after removing a hydroxy group from a corresponding diol (HO—$R^3$—OH),
i.e., an alkylene group having 3 to 18 carbon atoms, and $n_3$ represents a positive integer, which is preferably 2 to 50.

Specific examples of the raw material used for producing the polycarbonate polyol represented by Formula (1) include: 1,3-propanediol, 1,4-butanediol, 1,5-pentanediol, 1,6-hexanediol, 3-methyl-1,5-pentanediol, 1,8-octanediol, 1,3-cyclohexanedimethanol, 1,4-cyclohexanedimethanol, 1,9-nonanediol, 2-methyl-1,8-octanediol, 1,10-decamethylene glycol, and 1,2-tetradecanediol, etc.

The polycarbonate polyol may be a polycarbonate polyol (copolymerized polycarbonate polyol) having a plurality of types of alkylene groups in its skeleton. Using a copolymerized polycarbonate polyol is advantageous in many cases from the viewpoint of preventing crystallization of (A) polyurethane containing a carboxy group. Further, taking the solubility to the solvent into account, using, in combination, a polycarbonate polyol having a branched skeleton and having hydroxy groups at the ends of the branched chains, is preferable.

(a3) Dihydroxy Compound Containing Carboxy Group

Preferably, (a3) a dihydroxy compound containing a carboxy group is a carboxylic acid or an amino carboxylic acid having a molecular weight of 200 or less, having two groups selected from a hydroxy group, a hydroxyalkyl group with one carbon, and a hydroxyalkyl group with 2 carbons, because a cross linking point is controllable. Specific examples include: 2,2-dimethylolpropionic acid, 2,2-dimethylolbutanoic acid, N,N-bis hydroxyethyl glycine, N,N-bis hydroxyethyl alanine, and the like. Among them, in view of the solubility to the solvent, 2,2-dimethylolpropionic acid, 2,2-dimethylolbutanoic acid are particularly preferable. One type of the compounds of (a3) dihydroxy compound containing a carboxy group can be used by itself, or two or more types may be used in combination.

The above-mentioned (A) a polyurethane containing a carboxy group can be synthesized from the above three components ((a1), (a2), and (a3)) only. However, (a4) a monohydroxy compound and/or (a5) a monoisocyanate compound may be further reacted for synthesis. In view of the weather resistance and the light resistance, using a compound which does not have an aromatic ring and a carbon-carbon double bond in a molecule is preferable.

The (A) polyurethane containing a carboxy group can be synthesized by reacting the above-mentioned (a1) polyisocyanate compound, (a2) polyol compound, and (a3) dihydroxy compound containing a carboxy group, under the presence or absence of a known urethanization catalyst such as dibutyltin dilaurate, using an appropriate organic solvent. However, performing reaction without a catalyst is preferable because there would be no need to concern about the mixing of tin, etc., in the final product.

The organic solvent is not particularly limited as far as the reactivity with the isocyanate compound is low, but a preferable solvent is a solvent free from a basic functional group such as amine, etc., and having a boiling point of 50° C. or higher, preferably 80° C. or higher, and more preferably 100° C. or higher. Examples of such a solvent include: toluene, xylylene, ethylbenzene, nitrobenzene, cyclohexane, isophorone, diethylene glycol dimethyl ether, ethylene glycol diethyl ether, ethylene glycol monomethyl ether acetate, propylene glycol monomethyl ether acetate, propylene glycol monoethyl ether acetate, dipropylene glycol monomethyl ether acetate, diethylene glycol monoethyl ether acetate, methyl methoxypropionate, ethyl methoxypropionate, methyl ethoxypropionate, ethyl ethoxypropionate, ethyl acetate, n-butyl acetate, isoamyl acetate, ethyl lactate, acetone, methyl ethyl ketone, cyclohexanone, N,N-dimethylformamide, N,N-dimethylacetamide, N-methylpyrrolidone, γ-butyrolactone, dimethyl sulfoxide, and the like.

Taking into account that it is not preferable to use an organic solvent in which the polyurethane to be generated does not dissolve well, and that the polyurethane is used as a raw material for an ink for the protective layer used for an electronic material, propylene glycol monomethyl ether acetate, propylene glycol monoethyl ether acetate, dipropylene glycol monomethyl ether acetate, diethylene glycol monoethyl ether acetate, γ-butyrolactone, etc., are particularly preferable among the above.

The addition sequence of the raw materials is not limited, but usually, first, (a2) polyol compound and (a3) dihydroxy compound having a carboxy group are provided, and dissolved or dispersed in the solvent, and thereafter, (a1) polyisocyanate compound is added by dropping at 20 to 150° C., and more preferably at 60 to 120° C., which is then reacted at 30 to 160° C., and preferably at 50 to 130° C.

The molar ratio of the added raw materials is adjusted in accordance with the molecular weight and the acid value of the objected polyurethane.

Specifically, the molar ratio of the provided materials is that isocyanato group of (a1) polyisocyanate compound: (hydroxy group of (a2) polyol compound+hydroxy group of (a3) dihydroxy compound having a carboxy group) is 0.5 to 1.5:1, preferably 0.8 to 1.2:1, and more preferably 0.95 to 1.05:1.

Further, hydroxy group of (a2) polyol compound: hydroxy group of (a3) dihydroxy compound having a carboxy group is 1:0.1 to 30, and preferably 1:0.3 to 10.

Examples of (B) epoxy compound include: an epoxy compound having two or more epoxy groups in one molecule, such as bisphenol-A type epoxy resin, hydrogenated bisphenol-A type epoxy resin, bisphenol-F type epoxy resin, novolak type epoxy resin, phenol novolak type epoxy resin, cresol novolak type epoxy resin, N-glycidyl type epoxy resin, bisphenol A novolak type epoxy resin, chelate type epoxy resin, glyoxal type epoxy resin, amino group-containing epoxy resin, rubber-modified epoxy resin, dicyclopentadiene phenolic type epoxy resin, silicone-modified epoxy resin, ε-caprolactone-modified epoxy resin, aliphatic-type epoxy resin containing a glycidyl group, alicyclic epoxy resin containing a glycidyl group, etc.

In particular, an epoxy compound having three or more epoxy groups in one molecule is more preferable. Examples of such an epoxy compound include: EHPE (registered trademark) 3150 (manufactured by Daicel Corporation), jER604 (manufactured by Mitsubishi Chemical Corporation), EPICLON EXA-4700 (manufactured by DIC Corporation), EPICLON HP-7200 (manufactured by DIC Corporation), pentaerythritol tetraglycidyl ether, pentaerythritol triglycidyl ether, TEPIC-S (manufactured by Nissan Chemical Corporation), and the like.

The (B) epoxy compound may contain an aromatic ring in a molecule, and in this case, the mass of (B) is preferably 20% by mass or less, relative to the total mass of (A) and (B).

The mixing ratio of (A) polyurethane containing a carboxy group relative to (B) epoxy compound is preferably 0.5 to 1.5, more preferably 0.7 to 1.3, and still more preferably 0.9 to 1.1, in terms of equivalent ratio of the carboxy groups of polyurethane relative to the epoxy groups of (B) epoxy compound.

Examples of (C) curing accelerator include: a phosphine-based compound such as triphenylphosphine, tributylphosphine (manufactured by Hokko Chemical Industry Co., Ltd.), Curezol (registered trademark) (imidazole-based epoxy resin curing agent: manufactured by Shikoku Chemicals Corporation), 2-phenyl-4-methyl-5-hydroxy methyl imidazole, U-CAT (registered trademark) SA series (DBU salt: manufactured by San-Apro Ltd.), Irgacure (registered trademark) 184, and the like. With respect to the used amount of these, if the amount is too small, the effect of addition cannot be obtained, whereas if the amount is too large, the electric insulation is decreased. Therefore, 0.1 to 10% by mass, more preferably 0.5 to 6% by mass, still more preferably 0.5 to 5% by mass, and particularly preferably 0.5 to 3% by mass, is used, relative to the total mass of (A) and (B).

Further, a curing aid may be used together. The curing aid may be a polyfunctional thiol compound, an oxetane compound, and the like. Examples of the polyfunctional thiol compound include: pentaerythritol tetrakis(3-mercaptopropionate), tris-[(3-mercaptopropionyloxy)-ethyl]-isocyanurate, trimethylolpropane tris(3-mercaptopropionate), Karenz (registered trademark) MT series (manufactured by Showa Denko K. K.), and the like. Examples of the oxetane compound include: ARON OXETANE (registered trademark) series (manufactured by Toagosei Co., Ltd.), ETERNACOLL (registered trademark) OXBP or OXMA (manufactured by Ube Industries Ltd.), and the like. With respect to the used amount, if the amount is too small, the effect of addition cannot be obtained, whereas if the amount is too large, the curing rate becomes too high, resulting in decreasing handling property. Therefore, 0.1 to 10% by mass, and preferably 0.5 to 6% by mass is used, relative to the mass of (B).

The content of (D) solvent used in the curable resin composite is preferably 95.0% by mass or more and 99.9% by mass or less, more preferably 96% by mass or more and 99.7% by mass or less, and still more preferably 97% by mass or more and 99.5% by mass or less. (D) solvent can be the solvent used for synthesizing (A) polyurethane containing a carboxy group as it is. Further, other solvent may be used for (D) in order to adjust the solubility of the polyurethane resin or printability. When other solvent is used, the reaction solvent may be distilled away before or after a new solvent is added, to replace the solvent. Taking into account the cumbersomeness of operations and the energy cost, using at least a part of the solvent used for synthesizing (A) polyurethane containing a carboxy group as it is, is preferable. Taking the stability of the composite for the protective layer into account, the contained solvent has a boiling point of preferably 80° C. to 300° C., and more preferably 80° C. to 250° C. If the boiling point is lower than 80° C., the composite is easily dried during the printing, which causes unevenness. If the boiling point is higher than 300° C., heat treatment at a high temperature for a long time is required for drying and curing, which is not suitable for industrial production.

Examples of the (D) solvent include: a solvent used for synthesizing polyurethane such as propylene glycol monomethyl ether acetate (boiling point 146° C.), γ-butyrolactone (boiling point 204° C.), diethylene glycol monoethyl ether acetate (boiling point 218° C.), tripropylene glycol dimethyl ether (boiling point 243° C.), etc., an ether-based solvent such as propylene glycol dimethyl ether (boiling point 97° C.), diethylene glycol dimethyl ether (boiling point 162° C.), etc., a solvent having a hydroxy group such as isopropyl alcohol (boiling point 82° C.), t-butyl alcohol (boiling point 82° C.), 1-hexanol (boiling point 157° C.), propylene glycol monomethyl ether (boiling point 120° C.), diethylene glycol monomethyl ether (boiling point 194° C.), diethylene glycol monoethyl ether (boiling point 196° C.), diethylene glycol monobutyl ether (boiling point 230° C.), triethylene glycol (boiling point 276° C.), ethyl lactate (boiling point 154° C.), etc., methyl ethyl ketone (boiling point 80° C.), and ethyl acetate (boiling point 77° C.). One of these solvents may be used by itself, or a mixture of two or more types of them may be used. When two or more types of solvents are mixed, using a solvent having a hydroxy group and having a boiling point exceeding 100° C. in view of the solubility of the used polyurethane resin, epoxy resin, etc., and in order to prevent aggregation or precipitation, or using a solvent having a boiling point of 100° C. or lower in view of the drying property of the ink, in addition to the solvent used for synthesizing (A) polyurethane containing a carboxy group, is preferable.

The above-mentioned curable resin composite can be produced by mixing (A) polyurethane containing a carboxy group, (B) epoxy compound, (C) curing accelerator, and (D) solvent so that the content of (D) solvent becomes 95.0% by mass or more and 99.9% by mass or less, and stirring the mixture until the mixture becomes uniform.

The solid content concentration in the curable resin composite may differ depending on the desired film thickness or printing method, but is preferably 0.1 to 10% by mass, and more preferably 0.5% by mass to 5% by mass. If the solid content concentration is within the range of 0.1 to 10% by mass, when the composite is coated on a transparent conducting layer, problem such that the electrical contact cannot be obtained due to the thick layer, do not occur, and a protective layer having a sufficient weather resistance and light resistance can be obtained.

From the viewpoints of weather resistance and light resistance, the ratio of an aromatic ring-containing compound which is defined by the following formula, in the protective layer (the solid content in the curable resin composite, i.e., (A) polyurethane containing a carboxy group, (B) epoxy compound, and a cured residue of (C) curing accelerator) is preferably suppressed to 15% by mass or less. Here, the "cured residue of (C) curing accelerator" refers to (C) curing accelerator remaining in the protective layer under some curing conditions, while all or a part of the (C) curing accelerator may be disappeared (decomposed, vaporized, etc.) depending on the curing conditions. When the amount of (C) curing accelerator remaining in the cured protective layer cannot be precisely measured, preferably, the provided amount of (C) curing accelerator is used for calculation under the assumption that none of the (C) curing accelerator has been disappeared under the curing conditions, and the amount of (C) curing accelerator used is determined so that the ratio of the aromatic ring-containing compound becomes 15% by mass or less. Here, the "aromatic ring-containing compound" refers to a compound having at least one aromatic ring in a molecule.

Ratio of aromatic ring-containing compound=[(used amount of aromatic ring-containing compound)/(mass of protective layer (mass of (A) polyurethane containing a carboxy group+mass of (B) epoxy compound+mass of cured residue of (C) curing accelerator))]×100(%)

The above-mentioned curable resin composite is used in a printing method such as bar-coat printing, gravure printing, ink-jet printing, slit coating, and the like. The curable resin composite is coated on a substrate having metal nanowire layer formed thereon, the solvent thereof is dried and removed, and thereafter, the curable resin is cured to form a protective layer. The protective layer obtained after the curing has a thickness exceeding 30 nm and 1 μm or less. The protective layer has a thickness of preferably more than 50 nm and 500 nm or less, more preferably more than 100 nm and 200 nm or less. If the thickness is 1 μm or less, obtaining conduction with the wiring, in the subsequent process, becomes easy. If the thickness exceeds 30 nm, an effect of protecting the metal nanowire layer can be sufficiently achieved.

The transparent conducting film obtained as above should be made into a size appropriate for producing a device. Specifically, the transparent conducting film after the protective layer is formed, should be cut into a required size.

The cutting of the transparent conducting film may be performed by a cutter knife, a disc cutter, Thomson pressing, laser cutting, slitting, and the like. Among them, using the disc cutter, Thomson processing are preferable.

When the cutting is performed, the transparent conducting film only may be cut, or the transparent conducting film with the protection film stacked thereon may be cut. When the transparent conducting film with the protection film stacked thereon is cut, the protection film is peeled off after the cutting. From the viewpoints of preventing the adhesion of foreign objects to the conductive surface, and preventing unnecessary damages on the conductive surface caused by the cutting, cutting with the protection film stacked thereon is preferable.

As mentioned above, the inventor found out that the transparent conducting film obtained by sequentially forming a transparent conducting layer (silver nanowire layer) and a protective layer on a transparent substrate has a durability of folding which is influenced by the state of the cut portion of the transparent conducting film. The state of the cut portion is determined by straightness in accordance with JIS B0683. Having a smaller straightness value (unit: mm) at a cut portion means that the cut portion is smoother. When the cut portion (end face) to be folded by the below-mentioned folding test has a straightness of 0.050 mm or less, a preferable durability of folding can be obtained. The smaller straightness is the more preferable, and thus, the straightness is preferably 0.040 mm or less, and more preferably 0.030 mm or less. When the cut portion of the transparent conducting film has a straightness 0.050 mm or less, in the folding test performing 200,000 times of folding, by a clamshell type folding durability tester which is set to have a curvature radius of 2 mm or less, a resistance value ($R_0$) representing a resistance value of the transparent conducting film before the folding test, and a resistance value (R) representing a resistance value after the folding test, can satisfy a ratio ($R/R_0$) of 2.0 or less. Thus, the transparent conducting film can be determined as foldable. The smaller the straightness at the end face of the transparent conducting film, the smaller the curvature radius with which a ratio ($R/R_0$) of 2.0 or less can be satisfied after the folding test performing 200,000 times of folding. When the straightness is 0.030 mm or less, even in the folding test using a clamshell type folding durability tester set to have a curvature radius of 0.5 mm, ($R/R_0$) of 2.0 or less can be satisfied after 200,000 times of folding, under predetermined conditions. The ($R/R_0$) after 200,000 times of folding is preferably 1.5 or less, and more preferably 1.2 or less.

EXAMPLES

Hereinbelow, specific examples of the present disclosure will be specifically explained. The examples are described below for the purpose of easy understanding of the present disclosure, and the present disclosure is not limited to these examples.

<Summary of Transparent Conducting Film Evaluation Method>

As shown in FIG. 1, from an elongated resin film F in a roll shape (Example 1 to Example 5, Example 8, Example 9, and Comparative Example 1 to Comparative Example 4: cyclo-olefin polymer film ZF14-013 (glass transition temperature: 136° C. [catalog value], thickness: 13 μm, manufactured by Zeon Corporation), Example 6 and Example 7: cyclo-olefin polymer film ZF14-023 (glass transition temperature: 136° C. [catalog value], thickness: 23 μm, manufactured by Zeon Corporation), a A4-size transparent substrate S was cut out, in a way so that the longitudinal direction (MD) of the resin film F matches the longitudinal direction of the A4-size transparent substrate S.

A silver nanowire ink was made, and thereafter, the silver nanowire ink as coated on one main face of the A4-size transparent substrate S, which was dried to form a silver nanowire layer. Subsequently, a curable resin composite was made, and thereafter, the curable resin composite was coated on the silver nanowire layer, which was dried to form a protective layer. Accordingly, an A4-size transparent conducting film was made.

In case of making a transparent conducting film having a transparent conducting layer (silver nanowire layer) on both of the main faces thereof, respectively, a silver nanowire layer and a protective layer were sequentially formed on one main face, and thereafter, a silver nanowire layer and a protective layer were sequentially formed on the other main face.

The A4-size transparent conducting film was cut by a predetermined method to obtain test pieces each having a different straightness at the cut portion (end face). These test pieces were subjected to folding tests wherein the direction of a folding axis is arranged perpendicular to or parallel with the longitudinal direction (MD) of the resin film F used. Thereby, the durability of folding was evaluated. FIG. 1 shows a sample s1 which is arranged so that the direction of the folding axis (represented by a dotted line) is perpendicular to the longitudinal direction (MD) of the resin film F; and a sample s2 which is arranged so that the direction of the folding axis is parallel with the longitudinal direction (MD) of the resin film F In addition, a sheet resistance and a total light transmittance were measured, so as to confirm that the transparent conducting film had a sufficiently low sheet resistance value and a sufficiently preferable total light transmittance.

<Preparation of Silver Nanowire>

Polyvinylpyrrolidone K-90 (manufactured by Nippon Shokubai Co., Ltd.) (0.98 g), $AgNO_3$ (1.04 g), and $FeCl_3$ (0.8 mg) were dissolved in ethylene glycol (250 ml), and subjected to thermal reaction at 150° C. for one hour. The obtained silver nanowire coarse dispersion liquid was dispersed in 2000 ml of water, which was poured into a desktop small tester (using ceramic membrane filter Cefilt, membrane area: 0.24 $m^2$, pore size: 2.0 μm, size Φ: 30 mm×250 mm, filtration differential pressure: 0.01 MPa, manufactured by NGK Insulators, Ltd.), and was subjected to cross-flow filtration at a circulation flow rate of 12 L/min and a dispersion liquid temperature of 25° C., to remove impurities. Thereby, silver nanowires (average diameter: 26 nm, average length: 20 μm) were obtained. During the cross-flow filtration, the water/ethanol displacement was performed, and finally, a dispersion liquid of a water/ethanol mixed solvent (silver nanowire concentration: 3% by mass, water/ethanol=41/56 [mass ratio]) was obtained. The average diameter of the obtained silver nanowires was obtained by using Field Emission Scanning Electron Microscope JSM-7000F (manufactured by JEOL Ltd.). Diameters of arbitrarily selected 100 silver nanowires were measured, and the arithmetic average value thereof was calculated. The average length of the obtained silver nanowires was obtained by using Shape Measurement Laser Microscope VK-X200 (manufactured by Keyence Corporation). Lengths of arbitrarily selected 100 silver nanowires were measured, and the arithmetic average value thereof was calculated. Regarding the ethanol, ethylene glycol, $AgNO_3$, and $FeCl_3$, reagents manufactured by FUJIFILM Wako Pure Chemical Corporation were used.

<Preparation of Conductive Ink (Silver Nanowire Ink)>

5 g of dispersion liquid in which silver nanowires synthesized by the polyol method were dispersed in a mixed solvent of water/ethanol (silver nanowire concentration 3% by mass, water/ethanol=41:56 [mass ratio]), 6.4 g of water, 20 g of methanol (manufactured by FUJIFILM Wako Pure Chemical Corporation), 39 g of ethanol (manufactured by FUJIFILM Wako Pure Chemical Corporation), 25 g of propylene glycol monomethyl ether (PGME, manufactured by FUJIFILM Wako Pure Chemical Corporation), 3 g of propylene glycol (PG, manufactured by AGC Inc.), and 1.8 g of PNVA (registered trademark) aqueous solution (manufactured by Showa Denko K.K., solid content concentration 10% by mass, weight average molecular weight 900,000), were mixed and stirred (rotation speed: 100 rpm) by Mix Rotor VMR-5R (manufactured by AS ONE Corporation) for one hour, at a room temperature and under an air atmosphere, and thereby, 100 g silver nanowire ink was produced. The final mixing ratio [mass ratio] was silver nanowire/PNVA/water/methanol/ethanol/PGME/PG=0.15:0.18:10:20:42:25:3.

The thermal decomposition starting temperature of PNVA (registered trademark) was measured by TG-DTA2000 manufactured by NETZSCH K. K. Approximately 10 mg of a sample was provided in a platinum pan and was subjected to measurement as below in an air atmosphere, and a thermal decomposition starting temperature was obtained as a temperature which is 120° C. or higher (in order to ignore the influences of the weight reduction which can be found around 100° C. relating to the moisture absorbed in the sample since preliminary drying of the sample was not performed), and at which weight reduction of 1% occurred. Air Atmosphere, Temperature Conditions: room temperature→(10° C./min)→700° C. (compressor air 100 mL/min)

The thermal decomposition starting temperature of PNVA (registered trademark) used for producing the silver nanowire ink was 270° C.

The silver nanowire concentration of the obtained silver nanowire ink was measured by AA280Z Zeeman atomic absorption spectrophotometer, manufactured by Varian.

<Preparation of Transparent Conductive Layer (Silver Nanowire Layer)>

A cyclo-olefin polymer film ZF14-013 (glass transition temperature 136° C. [catalog value], thickness 13 μm, manufactured by Zeon Corporation) of A4 size, as a transparent substrate S, was subjected to plasma treatment (used gas: nitrogen, feed speed: 50 mm/sec, treatment time: 6 sec, set voltage: 400 V) using a plasma processing equipment (AP-T03, manufactured by Sekisui Chemical Co., Ltd.). A silver nanowire ink was coated (coating velocity: 500 mm/sec) on the entire surface of the transparent substrate S to have a wet thickness of 22 μm, by using TQC Automatic Film Applicator Standard (manufactured by Cotec K.K.) and Wireless Bar Coater OSP-CN-22L (manufactured by Cotec K.K.). Thereafter, the coated film was subjected to hot-air drying at 80° C., for 1 minute, and under an air atmosphere, by using a constant temperature oven HISPEC HS350 (manufactured by Kusumoto Chemicals Ltd.), and thereby a silver nanowire layer was obtained.

<Measurement of Layer Thickness>

A thickness of the transparent conducting layer (silver nanowire layer) was measured using a film thickness measurement system F20-UV (manufactured by Filmetrics Japan, Inc.). Measurement was performed at three different points, and an average value of the measurement results of the three points was used as a film thickness. For analysis, spectrum of 450 nm to 800 nm was used. According to this measurement system, the layer thickness ($T_c$) of the silver nanowire layer formed on the transparent substrate can be directly measured. Table 1 shows the measurement results.

<Preparation of Curable Resin Composite>

Synthesis Example of (A) Polyurethane Containing Carboxy Group 42.32 g of C-1015N (polycarbonate diol, molar ratio of raw material diols: 1,9-nonanediol:2-methyl-1,8-octanediol=15:85, molecular weight: 964, manufactured by Kuraray Co., Ltd.) as a polyol compound, 27.32 g of 2,2-dimethylol butanoic acid (manufactured by Nihon Kasei Co., Ltd.) as a dihydroxy compound containing a carboxy group, and 158 g of diethylene glycol monoethyl ether acetate (manufactured by Daicel Corporation) as a solvent were provided in a 2 L three-neck flask having a stirrer, a thermometer, and a condenser, and the 2,2-dimethylol butanoic acid was dissolved at 90° C.

The temperature of the reaction solution was lowered to 70° C., and 59.69 g of Desmodur (registered trademark)-W (bis-(4-isocyanatocyclohexyl)methane), manufactured by Sumika Covestro Urethane Co., Ltd.) as polyisocyanate was dropped thereto for 30 minutes by a dropping funnel. After the dropping was complete, the temperature was raised to 120° C., and the reaction was performed at 120° C. for 6 hours. After the confirmation by IR that almost all of the isocyanate disappeared, 0.5 g of isobutanol was added, which was further reacted at 120° C. for 6 hours. The obtained carboxy group-containing polyurethane had a weight average molecular weight, obtained by GPC, of 32300, and a resin solution thereof had an acid value of 35.8 mgKOH/g.

10.0 g of solution of (A) polyurethane containing a carboxy group, obtained as above (content of the carboxy group-containing polyurethane: 45% by mass) was weighed in a plastic container, 85.3 g of 1-hexanol and 85.2 g of ethyl acetate were added thereto as (D) solvent, and the resultant was stirred (rotation speed: 100 rpm) by Mix Rotor VMR-5R (manufactured by AS ONE Corporation) for 12 hours, at a room temperature and under an air atmosphere. After visually confirming that the mixture is uniform, 0.63 g of pentaerythritol tetraglycidyl ether (manufactured by Showa Denko K.K.) as (B) epoxy compound, and 0.31 g of U-CAT5003 (compound name: benzyltriphenylphosphonium bromide, manufactured by San-Apro Ltd.) as (C) curing accelerator were added, and stirred by Mix Rotor again for one hour, to thereby obtain curable resin composite. The ratio of an aromatic ring-containing compound in the solid content of the curable resin composite (in the protective layer formed by the curable resin composite) is 5.7% by mass.

<Preparation of Protective Layer>

A curable resin composite was coated on the entirety of the silver nanowire layer formed on the transparent substrate S, by TQC Automatic Film Applicator Standard (manufactured by Cotec K.K.) and a wireless bar coater OSP-CN-05M (manufactured by Cotec K.K.) (coating velocity 333 mm/sec) to have a wet thickness of 5 μm. Thereafter, the coated layer was subjected to hot-air drying (thermal curing) at 80° C., for 1 minute, and under an air atmosphere, by using a constant temperature oven HISPEC HS350 (manufactured by Kusumoto Chemicals Ltd.), and thereby a protective layer was formed, and a transparent conducting film according to the example was produced.

In case of a transparent conducting film having a transparent conducting layer (silver nanowire layer) on both of the main faces thereof, respectively, a silver nanowire layer and a protective layer were sequentially formed on one main face, and thereafter, a silver nanowire layer and a protective layer were sequentially formed on the other main face.

<Thickness of Protective Layer>

A thickness of the protective layer was measured using a film thickness measurement system F20-UV (manufactured by Filmetrics Japan, Inc.) based on optical interferometry, in the same way as the thickness measurement of the silver nanowire layer. Measurement was performed at three different points, and an average value of the measurement results of the three points was used as a film thickness. For analysis, spectrum of 450 nm to 800 nm was used. According to this measurement system, the total layer thickness ($T_c+T_p$) can be directly measured, the layer thickness ($T_c$) being a thickness of the silver nanowire layer formed on the transparent substrate, and the layer thickness ($T_p$) being a thickness of the protective layer formed on the silver nanowire layer. Thus, by subtracting the previously measured layer thickness ($T_c$) of the silver nanowire layer from this measurement value ($T_c+T_p$), the layer thickness ($T_p$) of the protective layer can be obtained.

<Preparation of Various Test Pieces (Cutting by Various Methods), Straightness Measurement>

The transparent conducting film obtained by the above method was provided, on both of the main faces thereof respectively, with a protection film attached, and thereafter, the film was cut by the below-mentioned methods to have predetermined sizes (150 mm*15 mm and 150 mm*100 mm), and thereafter, the protection films were peeled off. Thereby, test pieces each having different straightness at the cut portion were obtained. The sample of 150 mm*15 mm was prepared in two types as s1 and s2 in FIG. 1, and the sample of 150 mm*100 mm was prepared in one type as s1 in FIG. 1.

The protection films used were EXR911 (C5 grade) (manufactured by Sun A Kaken Co., Ltd.) which has a substrate of 125-μm-thick PET, and an acrylic adhesive layer, and TORETEC N711 (manufactured by Toray Advanced Film Co., Ltd.) which is self-adhesive with a substrate of 30-μm-thick PE The straightness of the cut portion of the transparent conducting film was measured using Image Dimension Measurement System LM1000 and LM1100 (manufactured by Keyence Corporation), in accordance with JISB0683. FIG. 2 shows a schematic view of the straightness. In FIG. 2, the contour of the cut portion is shown by Lo, the geometrically correct straight line (hereinafter, referred to as proper straight line) is shown by La, and the straightness is shown by St. As shown in FIG. 2, a proper straight line (regression line) La is calculated by the least-square method based on the contour Lo, and the straightness St is obtained as a distance between two parallel lines drawn on the upper side and the lower side of the proper straight line La, each of the two lines being parallel with the proper straight line La and passing through a point which is on the contour Lo and is farthest from the proper straight line La.

The cut portion was scanned at three points (in the end face along the major side of each of the samples s1 and s2, within the ranges of upper ⅓ (50 mm), intermediate ⅓ (50 mm), and lower ⅓ (50 mm)) (scan length being approximately 3 cm at each point), an average value of the straightness values respectively obtained at the three points was calculated.

| <Straightness> | | <Cutting Method> |
|---|---|---|
| 0.028 mm | Thomson processing | automatic cut (using machine) |
| 0.050 mm | disc cutter | manual cut |
| 0.060 mm | laser cutting | automatic cut (using machine) |
| 0.176 mm | cutter knife | manual cut |

For reference, observation results of the respective cut portions, using Shape Measurement Laser Microscope VK-X200 (manufactured by Keyence Corporation) are shown in FIG. 3 to FIG. 6. FIG. 3 shows a result by Thomson processing (straightness 0.028 mm), FIG. 4 shows a result by a disc cutter (straightness 0.050 mm), FIG. 5 shows a result by laser cutting (straightness 0.060 mm), and FIG. 6 shows a result by a cutter knife (straightness 0.176 mm), respectively. The observation results shown in FIG. 3 and FIG. 4 reveal that when the numerical value of the straightness is small, the cut portion is smooth. On the other hand, in case of FIG. 5 having a straightness of 0.060 mm, the cut portion is curved. Is it assumed that this is an influence from a spot circle of a laser beam used during the laser cutting. Further, referring to the observation result shown in FIG. 6, with a straightness of 0.176 mm, the cut portion appears to be turned over, which seems to cause the large straightness value.

<Folding Test>

For the folding test, a small desktop durability test system Tension-Free (registered trademark) Folding Clamshell-type (manufactured by Yuasa System Co., Ltd., hereinafter, may be referred to as a device) capable of performing folding test at 180°, was used. For the silver paste, the conductive paste DW-420L-2A (manufactured by Toyobo Co., Ltd.) was used. The paste was manually coated to be an approximately 2 mm square, so that an end of the 2-mm-square terminal is arranged at each of the positions which are 40 mm distant from the approximate center (a position 75 mm distant from opposing minor sides, and equally distant from the opposing major sides) of the test piece (sample s1, s2) in the longitudinal direction, respectively (distance between terminals: 80 mm). The test piece was then subjected to hot-air drying at 80° C., for 30 minutes, and under an air atmosphere, by using a constant temperature oven HISPEC HS350 (manufactured by Kusumoto Chemicals Ltd.), and thereby the terminal parts were formed.

The produced test piece was fixed on the device by adhering with a tape, so that the center of the distance between the terminals was located on the center of the folding line of the device. At the time of the folding test, the curvature radius was 0.5 mm, 1.0 mm, and 2.0 mm, the folding speed was 30 rpm (performing 30 times of folding-opening operations per minute). The presence/absence of a fracture, and the change of resistance values between the terminals before and after the 200,000 times of folding (before the folding test, and after the folding test of 200,000 times) were evaluated. The presence/absence of a fracture was visually confirmed. The resistance value between the silver paste terminals formed by the above-mentioned method was measured by Digital Multimeter PC5000a (manufactured by Sanwa Electric Instrument Co., Ltd.). The resistance value ($R_0$) before the start of the folding test, and the resistance value (R) after the folding test (200,000 times of folding-opening operations) were measured, respectively, and a ratio ($R/R_0$) between the resistance value before the start of the folding test and the resistance value after the folding test was calculated and the change was evaluated.

In case that the test piece has no fracture, and the ratio ($R/R_0$) of the resistance values measured by using silver paste is 2.0 or less, evaluation was described as Good. When a fracture occurred in the test piece, and the resistance value could not be measured, evaluation was described as Poor.

TABLE 1

| | Unit | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Substrate Thickness | μm | 13 | 13 | 13 | 13 | 13 | 23 | 23 | 13 | 13 | 13 |
| Substrate Grass Temperature Transition | ° C. | 136 | 136 | 136 | 136 | 136 | 136 | 136 | 136 | 136 | 136 |
| Transparent Conductive Layer (One face/Both faces) | | One Face | One Face | One Face | Both Faces | Both Faces | Both Faces | Both Faces | One Face | One Face | One Face |
| Sheet Resistance (1st Face) | Ω/□ | 40 | 40 | 40 | 40 | 40 | 40 | 40 | 40 | 40 | 40 |
| Sheet Resistance (2nd Face) | Ω/□ | | | | 40 | 40 | 40 | 40 | | | |
| Total Light Transmittance | % | 89.5 | 89.5 | 89.5 | 89.0 | 89.0 | 89.0 | 89.0 | 89.5 | 89.5 | 89.5 |
| Silver Nanowire Layer Thickness (1st Face) TC1 | nm | 80 | 80 | 80 | 80 | 80 | 80 | 80 | 80 | 80 | 80 |
| Protective Layer Thickness (1st Face) TP1 | nm | 90 | 90 | 90 | 90 | 90 | 90 | 90 | 90 | 90 | 90 |
| Silver Nanowire Layer Thickness (2nd Face) TC2 | nm | | | | 80 | 80 | 80 | 80 | | | |

TABLE 1-continued

| | Unit | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Protective Layer Thickness (2nd Face) TP2 | nm | | | | 90 | 90 | 90 | 90 | | | |
| Cut Portion Straightness | mm | 0.028 | 0.050 | 0.050 | 0.028 | 0.050 | 0.028 | 0.028 | 0.060 | 0.176 | 0.060 |
| Resin Film Longitudinal Direction and Folding Axis (Perpendicular (PERP)/ Parallel (PAR)) | | PERP | PERP | PAR | PERP | PERP | PERP | PAR | PERP | PERP | PERP |
| Result After 200,000 Times of Folding — Curvature Radius 0.5 mm | mm | Good (R/R0 = 1.1) | | | Good (R/R0 = 1.1) | | | | | | |
| Result After 200,000 Times of Folding — Curvature Radius 1.0 mm | mm | | Good (R/R0 = 1.1) | Good (R/R0 = 1.1) | | | Good (R/R0 = 1.1) | | | | Poor |
| Result After 200,000 Times of Folding — Curvature Radius 2.0 mm | mm | | | | | Good (R/R0 = 1.1) | | Good (R/R0 = 1.1) | Poor | Poor | |

Good: No fracture in test piece. Change in Resistance measured by silver paste R/R0 being 2.0 or less
Poor: Test piece being fractured. Resistance measurement being impossible Table 1 shows the evaluation results of the test piece cut to have a 150 mm*15 mm size. In Table 1, each of Example 1 to Example 5, and Comparative Example 1 to Comparative Example 3 shows evaluation results of a transparent conducting film prepared by using a 13-µm-thick transparent resin substrate (cyclo-olefin polymer film ZF14-013 (manufactured by Zeon Corporation)). They are different in terms of the straightness of the cut portion, the relationship between the longitudinal direction (MD) of the resin film and the folding axis (perpendicular/parallel), and whether the transparent substrate having the transparent conducting layer(s) (silver nanowire layer(s)) on one/both of the main faces. Example 6 and Example 7 shows evaluation results of a transparent conducting film prepared by using a 23-µm-thick transparent resin substrate (cyclo-olefin polymer film ZF14-023 (manufactured by Zeon Corporation)). They are different in terms of the straightness of the cut portion, and the relationship between the longitudinal direction (MD) of the resin film and the folding axis (perpendicular/parallel).

In Example 1 to Example 7 in each of which the cut portion of the transparent conducting film has a straightness of 0.050 mm or less, the test piece has no fracture after the 200,000 times of folding, and the resistance change ratio is within 10%, resulting in showing a preferable durability of folding. On the other hand, in Comparative Example 1 and Comparative Example 2 in each of which the straightness exceeds 0.050 mm, even if the curvature radius is extended to 2 mm, the test piece cannot withstand the 200,000 times of folding, and is fractured. Namely, by adjusting the straightness of cut portion of the transparent conducting film to be 0.050 mm or less, a transparent conducting film having a superior folding property can be obtained. Also, the smaller the curvature radius, the severer the conditions. Thus, as shown in Comparative Example 3, the transparent conducting film (straightness 0.060 mm) which is fractured with a curvature radius of 2 mm (Comparative Example 1), is also fractured with a smaller curvature radius (1 mm).

Further, as shown in Example 4 to Example 7, even when the silver nanowire layers are respectively provided on both of the main faces, as far as the cut portion of the transparent conducting film has a straightness of 0.050 mm or less, the film is durable of 200,000 times of folding when curvature radius is 1 mm or more.

Judging from Example 2 and Example 3, when the curvature radius is 1 mm, as far as the cut portion of the transparent conducting film has a straightness of 0.050 mm or less, a preferable durability of folding can be obtained, regardless of whether the longitudinal direction (MD) of the resin film F and the folding axis are perpendicular or in parallel with each other (sample s1, sample s2).

Further, when the curvature radius is 0.5 mm, if the longitudinal direction (MD) of the resin film F is in parallel with the folding axis (sample s2), the transparent conducting film may be fractured even if the cut portion has a straightness of 0.050 mm or less. However, when the straightness is 0.030 mm or less (0.028 mm), and the longitudinal direction (MD) of the resin film F and the folding axis are perpendicular with each other (sample s1), in both of the cases that the conducting layer is formed on one face, and that the conducting layers are provided on both of the main faces, respectively, the test piece is durable of 200,000 times of folding (Example 1, Example 4). Judging from these results, the transparent conducting film is preferably cut in the direction so that the longitudinal direction (MD) of the resin film F is perpendicular to the folding axis for folding. In the present specification the term "perpendicular" refers to not only the state of just 90 degrees (right angle), but also the state having slight differences from 90 degrees (a range 85 to 95 degrees). Further, the cut portion of the transparent conducting film has a straightness of, still more preferably, 0.030 mm or less.

In other words, except for the case that the transparent conducting film is cut so that the longitudinal direction (MD) of the resin film F is not perpendicular to the folding axis at which the folding is performed, and the transparent conducting film is folded at a curvature radius of less than 1.0 mm, preparing the cut portion of the transparent conducting film to have a straightness of 0.050 mm is effective to achieve a preferable durability of folding. On the other hand, when the transparent conducting film is subjected to folding with a curvature radius of less than 1.0 mm, the cutting direction of the transparent conducting film is preferably made so that the longitudinal direction (MD) of the resin film F is perpendicular to the folding axis at the time of folding. Still more preferably, the cut portion of the transparent conducting film has a straightness of 0.030 mm or less.

Table 2 shows the results of the test piece which was cut to 150 mm*100 mm size.

According to Example 8 and Example 9 in each of which the cut portion of the transparent conducting film has a straightness of 0.050 mm or less, the test piece is not fractured, and the change in the resistance stays within 10%, even after the 200,000 times of folding with a curvature radius of 2 mm and 1 mm, resulting in exhibiting preferable durability of folding. On the other hand, according to Comparative Example 4 in which the straightness is 0.060 mm, the test piece cannot withstand the 200,000 times of folding with the curvature radius of 2 mm. Namely, this result reveals that, same as the results shown in Table 1, the durability of folding is increased when the cut portion of the transparent conducting film has a straightness of 0.050 mm or less. Further, this result also reveals that the present disclosure is effective when the film has a large size of 150 mm*100 mm, which is closer to the size of an actual device.

TABLE 2

|  |  | Unit | Ex. 8 | Ex. 9 | Comp. Ex. 4 |
|---|---|---|---|---|---|
| Substrate Thickness | | μm | 13 | 13 | 13 |
| Transparent Conductive Layer | | | One Face | One Face | One Face |
| Sheet Resistance (1st Face) | | Ω/□ | 40 | 40 | 40 |
| Total Light Transmittance | | % | 89.5 | 89.5 | 89.5 |
| Silver Nanowire Layer Thickness (1st Face) TC1 | | nm | 80 | 80 | 80 |
| Protective Layer Thickness (1st Face) TP1 | | nm | 90 | 90 | 90 |
| Cut Portion Straightness | | mm | 0.050 | 0.050 | 0.060 |
| Resin Film Longitudinal Direction and Folding Axis (Perpendicular (PERP)/Parallel (PAR)) | | | PERP | PERP | PERP |
| Result After 200,000 Times of Folding | Curvature Radius 0.5 1.0 | mm | | Good (R/R0 = 1.1) | |
| | 2.0 | | Good (R/R0 = 1.1) | | Poor |

Good: No fracture in test piece. Change in Resistance measured by silver paste R/R0 being 2.0 or less
Poor: Test piece being fractured. Resistance measurement being impossible <Sheet Resistance Measurement>

Aside from the test pieces for the folding test, a 3 cm*3 cm test piece was cut out from the A4-size transparent conducting film (silver nanowire film) having a coating on its entire surface, and a sheet resistance of the silver nanowire layer thereof was measured by 4-probe Resistivity Meter Loresta GP (manufactured by Mitsubishi Chemical Analytech Co., Ltd.). The measurement mode and the used probe were ESP mode and ESP probe.

As can be seen from the results shown in Table 1 and Table 2, the transparent conducting film of the present disclosure satisfies a sheet resistance value (100Ω/□ or less) necessary for producing a touch panel device. Regarding Example 4 to Example 7 in which the silver nanowire layers are respectively arranged on both of the main faces, sheet resistance values of the first face and the second face are respectively shown.

<Measurement of Total Light Transmittance>

Using the above 3 cm*3 cm test piece, measurement was performed by Haze meter COH7700 (manufactured by Nippon Denshoku Industries Co., Ltd.). The measurement results are shown in Table 1 and Table 2. The results reveal all of the test pieces have a total light transmittance of 85% or higher, and thus, all of them have superior transparency. Regarding Example 4 to Example 7 in which the conducting layers are respectively arranged on both of the main faces, since the total light transmittance of the first face and the second face cannot be separately measured, the measured value is the sum of the total light transmittances of respective faces. All of the transparent substrate (resin film), the transparent conducting layer (silver nanowire layer), and the protective layer used in the present disclosure have superior transparency, and thus, even when the silver nanowire layer are respectively provided on both of the main faces, the decrease in total light transmittance is extremely low, compared to the case where the conducting layer is provided on only one of the main faces.

The invention claimed is:

1. A transparent conducting film comprising:
   a transparent substrate, and
   a transparent conducting layer formed on at least one of main faces of the transparent substrate,
   wherein a cut portion of the transparent conducting film has a straightness of 0.050 mm or less in accordance with JIS B063, and
   when a resistance value (R0) and a resistance value (R) respectively represent resistance values of the transparent conducting film before and after a folding test of 200,000 times of folding using a clamshell type durability tester in which a curvature radius is set to 2.0 mm, the ratio (R/R0) is 2.0 or less.

2. A transparent conducting film according to claim 1, wherein when a resistance value (R0) and a resistance value (R) respectively represent resistance values of the transparent conducting film before and after a folding test of 200,000 times of folding using a clamshell type durability tester in which a curvature radius is set to 0.5 mm, the ratio (R/R0) is 2.0 or less.

3. A transparent conducting film according to claim 1, wherein the transparent conducting layer contains at least a binder resin and a conducting fiber, and a protective layer is provided on the transparent conducting layer.

4. A transparent conducting film according to claim 3, wherein the conducting fiber is a metal nanowire.

5. A transparent conducting film according to claim 4, wherein the metal nanowire is a silver nanowire.

6. A transparent conducting film according to claim 3, wherein the binder resin is soluble in alcohol, water, or a mixed solvent of alcohol and water.

7. A transparent conducting film according to claim 3, wherein the binder resin contains one selected from a group consisting of poly-N-vinylpyrrolidone, hydrophilic cellulose-based resin, butyral resin, and poly-N-vinylacetamide.

8. A transparent conducting film according to claim 1, wherein the transparent substrate is a cyclo-olefin polymer (COP) film.

9. A transparent conducting film according to claim 8, wherein the cyclo-olefin polymer (COP) film has a thickness of 1 to 50 μm.

10. A transparent conducting film according to claim 9, wherein the cyclo-olefin polymer (COP) film has a thickness of 5 to 25 μm.

11. A transparent conducting film according to claim 7, wherein the cyclo-olefin polymer (COP) film has a glass transition temperature (Tg) of 100 to 170° C.

12. A transparent conducting film according to claim 3, wherein the protective layer is a cured layer of a curable resin composite, and a content of an aromatic ring-containing compound in a solid content of the curable resin composite is 15% by mass or less.

13. A transparent conducting film according to claim 1, wherein the transparent substrate is an elongated resin film or a resin film cut out from an elongated resin film, and is foldable with a direction perpendicular to a longitudinal direction of the elongated resin film as a folding axis.

14. A transparent conducting film according to claim 2, wherein the transparent conducting layer contains at least a binder resin and a conducting fiber, and a protective layer is provided on the transparent conducting layer.

15. A transparent conducting film according to claim 14, wherein the conducting fiber is a metal nanowire.

16. A transparent conducting film according to claim 15, wherein the metal nanowire is a silver nanowire.

17. A transparent conducting film according to claim 14, wherein the binder resin is soluble in alcohol, water, or a mixed solvent of alcohol and water.

18. A transparent conducting film according to claim 14, wherein the binder resin contains one selected from a group consisting of poly-N-vinylpyrrolidone, hydrophilic cellulose-based resin, butyral resin, and poly-N-vinylacetamide.

19. A transparent conducting film according to claim 14, wherein the protective layer is a cured layer of a curable resin composite, and a content of an aromatic ring-containing compound in a solid content of the curable resin composite is 15% by mass or less.

20. A transparent conducting film according to claim 2, wherein the transparent substrate is an elongated resin film or a resin film cut out from an elongated resin film, and is foldable with a direction perpendicular to a longitudinal direction of the elongated resin film as a folding axis.

* * * * *

UNITED STATES PATENT AND TRADEMARK OFFICE
CERTIFICATE OF CORRECTION

PATENT NO. : 11,685,846 B2
APPLICATION NO. : 17/595961
DATED : June 27, 2023
INVENTOR(S) : Shigeru Yamaki and Shuhei Yoneda It is certified that error appears in the above-identified patent and that said Letters Patent is hereby corrected as shown below:

In the Claims

In Claim 1, at Column 24, Line 25:
Delete "B063" and insert --B0683--.

Signed and Sealed this
Twenty-fifth Day of July, 2023

Katherine Kelly Vidal
*Director of the United States Patent and Trademark Office*